United States Patent [19]

Kushitani et al.

[11] Patent Number: 5,348,916
[45] Date of Patent: Sep. 20, 1994

[54] ALKALI FREE GLASS

[75] Inventors: Hideki Kushitani; Manabu Nishizawa; Yasumasa Nakao, all of Yokohama, Japan

[73] Assignee: Asahi Glass Company Ltd., Tokyo, Japan

[21] Appl. No.: 152,927

[22] Filed: Nov. 16, 1993

Related U.S. Application Data

[63] Continuation of Ser. No. 873,205, Apr. 24, 1992, abandoned.

[30] Foreign Application Priority Data

Apr. 26, 1991 [JP] Japan .................. 3-124946

[51] Int. Cl.$^5$ ............................. C03C 3/091
[52] U.S. Cl. ...................... 501/66; 501/68; 501/69; 501/70; 501/72; 501/67
[58] Field of Search ............... 501/66, 68, 69, 70, 501/72, 67

[56] References Cited

U.S. PATENT DOCUMENTS

| | | | |
|---|---|---|---|
| 3,326,703 | 6/1967 | Harrington | 501/66 |
| 4,327,220 | 4/1982 | Orvik | 546/345 |
| 4,409,337 | 10/1983 | Dumbaugh, Jr. | 501/66 |
| 4,499,276 | 2/1985 | Malhotra et al. | 546/346 |
| 5,244,847 | 9/1993 | Kushitani et al. | 501/66 |

FOREIGN PATENT DOCUMENTS

| | | | |
|---|---|---|---|
| 0030101 | 6/1981 | European Pat. Off. | |
| 0063872 | 11/1982 | European Pat. Off. | |
| 169953 | 9/1984 | Japan | 507/67 |

Primary Examiner—Karl Group
Assistant Examiner—C. M. Bonner
Attorney, Agent, or Firm—Oblon, Spivak, McClelland, Maier & Neustadt

[57] ABSTRACT

An alkali free glass consisting essentially of from 50 to 60 wt % of $SiO_2$, from 8 to 16 wt % of $Al_2O_3$, from 4 to 10 wt % of $B_2O_3$, from 1.5 to 5 wt % of MgO, from 0 to 7 wt % of CaO, from 0 to 10 wt % of SrO, from 10 to 20 wt % of BaO and from 0 to 3 wt % of ZnO and essentially free from alkali metal oxides.

4 Claims, No Drawings

ALKALI FREE GLASS

This application is a continuation of application Ser. No. 07/873,205, filed on Apr. 24, 1992, now abandoned.

The present invention relates to an alkali free glass which is substantially free from alkali metal oxides and capable of being formed by a float method and which is thus useful as glass substrates for various displays or photo masks.

Heretofore, glass substrates for various displays, particularly those having a thin metal film formed on their surface, are required to have high levels of the following properties.

(1) Since they are exposed to high temperature during the step for the formation of the thin film, they are required to have a high strain point of at least 600° C.

(2) If they contain an alkali metal oxide, the alkali metal ions are likely to diffuse into the thin film, whereby the film properties are likely to deteriorate. Therefore, they are required to be substantially free from alkali metal ions.

(3) They are required to be free from internal and surfacial defects (bubbles, striae, inclusions, pits, scratch marks, etc.).

(4) They are required to have excellent chemical durability so as to be durable during the washing step.

However, in recent years, liquid crystal displays having thin film transistors (TFT) using amorphous silicon or polycrystalline silicon formed on a glass substrate, are increasing. The display substrates to be employed for the displays of this type are frequently exposed to several etchants containing hydrofluoric acid for etching e.g. Si, $SiO_2$ or $Si_3N_4$ in a semiconductor-forming step. Typical etchants include buffered hydrofluoric acid which is prepared by adding ammonium fluoride as a buffering agent to hydrofluoric acid and a mixed solution of hydrofluoric acid (HF) and nitric acid ($HNO_3$).

When exposed to buffered hydrofluoric acid, conventional alkali free glass becomes useless in many cases with a reaction product formed on its surface, which can not easily be removed.

When exposed to a mixed solution of HF and $HNO_3$, alkaline earth ions in the glass will react with fluoride ions ($F^-$) and nitrate ions ($NO_3^-$) in the solution to form a reaction product on its surface. When immersed in a mixed solution of HF and $HNO_3$, a glass containing substantial amounts of BaO and MgO among alkaline earth metal oxides in the glass, will form a fine crystalline substance on its surface, whereas a glass containing a substantial amount of CaO or SrO, will form a gel-like non-crystalline substance on its surface. This gel-like reaction product serves as a masking agent and thus causes etching irregularities, whereby a surface roughness of a few micrometers will be formed on the glass surface. Thus, such glass has a problem that it is not useful as a display glass where a high level of flatness is required.

Quartz glass or #7059 glass of Corning Incorporated containing only BaO as an alkaline earth metal oxide, may be mentioned as a glass which is durable against such etchants. However, quartz glass has a very high viscosity, and it is difficult to melt it, whereby the production cost tends to be high. On the other hand, #7059 glass has a problem that the $B_2O_3$ content is high, it is difficult to melt it since $B_2O_3$ evaporates during the melting operation, and the strain point is so low that glass shrinks during the process for forming semiconductors.

Japanese Unexamined Patent Publication No. 74935/1988 discloses a glass substantially free from MgO. This glass exhibits durability against buffered hydrofluoric acid, but has a problem that when it is immersed in hydrofluoric nitric acid, a surface roughness is formed since it contains no MgO.

Japanese Unexamined Patent Publication No 133334/1990 discloses an alkali free glass containing from 8 to 15 wt % of CaO. This glass has a problem that resistance to the mixed solution of HF and $HNO_3$ is not sufficient since it contains CaO excessively.

It is an object of the present invention to solve the above problems and to provide an alkali free glass which is free from forming turbidity by buffered hydrofluoric acid, free from forming a surface roughness by the mixed solution of HF and $HNO_3$ and excellent in other chemical durability and can easily be melted and formed and which has a high strain point and a low expansion coefficient and is capable of being formed by a float method.

The present invention provides an alkali free glass consisting essentially of from 50 to 60 wt % of $SiO_2$, from 8 to 16 wt % of $Al_2O_3$, from 4 to 10 wt % of $B_2O_3$, from 1.5 to 5 wt % of MgO, from 0 to 7 wt % of CaO, from 0 to 10 wt % of SrO, from 10 to 20 wt % of BaO and from 0 to 3 wt % of ZnO and essentially free from alkali metal oxides.

Now, the present invention will be described in detail with reference to the preferred embodiments.

Firstly, the reasons for limiting the compositional ranges of the respective components will be described.

If $SiO_2$ is less than 50 wt %, the chemical resistance of the glass will be poor, and the thermal expansion coefficient tends to be large, such being undesirable. On the other hand, if it exceeds 60 wt %, the melting property tends to be poor, and the liquidus temperature tends to increase, such being undesirable. $SiO_2$ is preferably within a range of from 53 to 57 wt %.

$Al_2O_3$ has a function to suppress the phase separation of the glass, to reduce the thermal expansion coefficient and to increase the strain point. If the amount is less than 8 wt %, this effect can not be obtained, and if it exceeds 16 wt %, the melting property of the glass deteriorates. $Al_2O_3$ is preferably within a range of from 10 to 14 wt % within the above range.

$B_2O_3$ is effective for preventing the formation of turbidity due to hydrofluoric acid and for providing a low expansion coefficient and good melting property. However, if it is less than 4 wt %, such effects can not be obtained, and if it exceeds 10 wt %, the strain point tends to be low, and the resistance to the mixed solution of HF and $HNO_3$ tends to be poor. $B_2O_3$ is preferably within a range of from 5.5 to 8.5 wt % within the above range.

MgO has a feature that it improves the resistance to the mixed solution of HF and $HNO_3$ without lowering the strain point, and it is contained in an amount of at least 1.5 wt %. If it exceeds 5 wt %, turbidity by buffered hydrofluoric acid or phase separation of the glass tends to occur, such being undesirable. MgO is preferably within a range of from 2 to 4.5 wt % within the above range.

CaO has a function to improve the melting property of the glass. However, if CaO exceeds 7 wt %, the resistance to the mixed solution of HF and $HNO_3$ of the glass tends to decrease, such being undesirable. CaO is preferably within a range of from 2 to 5 wt %.

SrO is a component effective for suppressing phase separation of the glass and for preventing turbidity by buffered hydrofluoric acid. However, if it exceeds 10 wt %, the thermal expansion coefficient tends to increase, and the resistance to the mixed solution of HF and $HNO_3$ tends to be low, such being undesirable. SrO is preferably within a range of from 2 to 8 wt %.

BaO is effective for preventing the phase separation of the glass, for improving the melting property and for controlling the liquidus temperature. However, if it is less than 10 wt %, such an effect is low, and if it exceeds 20 wt %, the thermal expansion coefficient tends to increase, and the chemical durability such as water durability tends to deteriorate. BaO is preferably within a range of from 12 to 18 wt %.

ZnO is effective for reducing the thermal expansion coefficient of the glass. However, if it exceeds 3 wt %, turbidity by hydrofluoric acid is likely to be formed, and during its production, it tends to be reduced in the float bath and evaporate to form a different quality layer on the glass surface, whereby forming by a float method tends to be difficult. ZnO is preferably within a range of from 0 to 2 wt %.

The glass of the present invention may contain not more than 5 wt % in total of $ZrO_2$, $P_2O_5$, $TiO_2$, $SO_3$, $As_2O_3$, $Sb_2O_3$, F and Cl in order to improve the melting property, refining property and formability of the glass in addition to the above-mentioned components.

The glass of the present invention can be prepared, for example, by the following process.

Starting materials commonly used for the respective components are mixed in the desired proportions, and the mixture is continuously introduced into a melting furnace and melted under heating at a temperature of from 1,500° to 1,600° C. This molten glass is formed into a sheet having a predetermined thickness by a float method, followed by annealing and cutting.

Now, the present invention will be described in further detail with reference to Examples. However, it should be understood that the present invention is by no means restricted to such specific Examples.

EXAMPLES

Starting materials of the respective components were mixed to have the desired proportions, and the mixture was heated and melted in a platinum crucible at a temperature of from 1,500° to 1,600° C. for 4 hours. The molten glass was stirred with a platinum stirrer for two hours for homogenizing the glass. Then, the molten glass was casted into a sheet form, followed by gradual cooling.

In Table 1, the glass composition (unit: wt %) is shown, and in Table 2, the thermal expansion coefficient, the temperatures where log $\eta=2.5$ and 4.0 ($\eta$ is the viscosity represented by poise), the liquidus temperature, the strain point, the water resistance, the acid resistance, the buffered hydrofluoric acid resistance and the resistance to the mixed solution of HF and $HNO_3$ are shown.

The water resistance was determined in such a manner that the glass was immersed in deionized water at 95° C. for 40 hours, whereupon the weight reduction was measured, and the water resistance was represented by the weight reduction per unit surface area of the glass.

The acid resistance was determined in such a manner that the glass was immersed in 1/100N $HNO_3$ at 95° C. for 20 hours, whereupon the weight reduction was measured, and the acid resistance was represented by the weight reduction per unit surface area of the glass.

The buffered hydrofluoric acid resistance was determined in such a manner that the glass was immersed in a mixed solution of $NH_4F$ and HF (a solution obtained by mixing a 40 wt % $NH_4F$ aqueous solution and a 51 wt % HF aqueous solution in a weight ratio of 9:1) at 25° C. for 20 minutes, whereupon the outer appearance was visually evaluated under the following standards:

⊙: excellent
○: good
X: poor

The resistance to the mixed solution of HF and $HNO_3$ was determined in such a manner that the glass was immersed in a mixed solution of HF and $HNO_3$ (solution obtained by mixing a 51 wt % HF aqueous solution and a 61 wt % $HNO_3$ aqueous solution in a volume ratio of 1:2) at 25° C. for 5 minutes, whereupon the surface roughness was measured, and the surface condition was evaluated under the following standards:

⊙: excellent
○: good
X: poor

As is evident from Table 2, the glass in each of the Examples has a low thermal expansion coefficient at a level of from 40 to $50 \times 10^{-7}$/°C., and the temperature where log $\eta=2.5$ as an index for the melting property, is relatively low, thus indicating that it can easily be melted.

With respect to the formability, the relation as an index of the formability between the temperature where log $\eta=4.0$ and the liquidus temperature is good, thus indicating that there will be no trouble of devitrification during the forming operation.

The strain point is also as high as at least 620° C., thus indicating that it is adequately durable against heat treatment at a high temperature.

Also with respect to the chemical properties, the glass of the present invention has excellent water resistance and acid resistance, scarcely forms turbidity by buffered hydrofluoric acid and scarcely forms a surface roughness by the mixed solution of HF and $HNO_3$.

On the other hand, Sample Nos. 9 and 10 represent Comparative Examples. Sample No. 9 is poor in the hydrofluoric nitric acid resistance, although it has a good melting property because of relatively low temperature for log $\eta=2.5$. On the other hand, with Sample No. 10, the temperatures where log $\eta=2.5$ and 4.0 are too high, whereby difficulties in melting and forming are expected, although the buffered hydrofluoric acid resistance and the resistance to the mixed solution of HF and $HNO_3$ are good.

TABLE 1

| | Sample No. | | | | | | | | | |
|---|---|---|---|---|---|---|---|---|---|---|
| | 1 | 2 | 3 | 4 | 5 | 6 | 7 | 8 | 9 | 10 |
| $SiO_2$ | 57 | 54 | 51 | 56 | 58 | 57 | 59 | 59 | 51 | 58 |
| $Al_2O_3$ | 11 | 14 | 15 | 11 | 12 | 11 | 9 | 12 | 13 | 16 |
| $B_2O_3$ | 6 | 8 | 9 | 6 | 6 | 6 | 8 | 5 | 11 | 11 |

TABLE 1-continued

| | Sample No. | | | | | | | | | |
|---|---|---|---|---|---|---|---|---|---|---|
| | 1 | 2 | 3 | 4 | 5 | 6 | 7 | 8 | 9 | 10 |
| MgO | 2 | 2 | 2 | 3 | 4 | 2 | 4 | 4 | — | 2 |
| CaO | 2 | 3 | — | — | 3 | 5 | 6 | 6 | 3 | 3 |
| SrO | 5 | 6 | 4 | 9 | 1 | 4 | — | — | 6 | 6 |
| BaO | 15 | 14 | 19 | 15 | 16 | 15 | 12 | 12 | 15 | 4 |
| ZnO | 2 | — | — | — | — | — | 2 | 2 | — | — |

TABLE 2

| | Sample No. | | | | | | | | | |
|---|---|---|---|---|---|---|---|---|---|---|
| | 1 | 2 | 3 | 4 | 5 | 6 | 7 | 8 | 9 | 10 |
| Thermal expansion coefficient ($\times 10^{-7}/°C$) | 47 | 44 | 43 | 48 | 46 | 49 | 47 | 47 | 45 | 34 |
| Temp. where $\log \eta = 2.5$ (°C.) | 1,505 | 1,490 | 1,513 | 1,491 | 1,501 | 1,510 | 1,470 | 1,508 | 1,472 | 1,560 |
| Temp. where $\log \eta = 4.0$ (°C.) | 1,227 | 1,210 | 1,236 | 1,207 | 1,217 | 1,220 | 1,170 | 1,221 | 1,177 | 1,278 |
| Liquidus temp. (°C.) | 1,155 | 1,170 | 1,160 | 1,142 | 1,163 | 1,150 | 1,160 | 1,210 | 1,155 | 1,310 |
| Strain point (°C.) | 636 | 633 | 624 | 630 | 637 | 629 | 630 | 640 | 603 | 640 |
| Water resistance (mg/cm$^2$) | 0.08 | 0.05 | 0.08 | 0.09 | 0.05 | 0.07 | 0.06 | 0.05 | 0.09 | 0.08 |
| Acid resistance (mg/cm$^2$) | 0.15 | 0.23 | 0.25 | 0.15 | 0.13 | 0.18 | 0.20 | 0.13 | 0.23 | 0.20 |
| Buffered hydrofluoric acid resistance | ⊚ | ⊚ | ○ | ○ | ⊚ | ○ | ○ | ○ | ○ | |
| Resistance to the mixed solution of HF and HNO$_3$ | ⊚ | ⊚ | ⊚ | ⊚ | ⊚ | ⊚ | ○ | ○ | X | ○ |

The glass of the present invention is capable of being formed by a float method, scarcely forms turbidity by buffered hydrofluoric acid, is excellent in the resistance to the mixed solution of HNO$_3$ and HF, has high heat resistance and a low thermal expansion coefficient. Thus, it is suitable for applications where such properties are required, for example, as display substrates, photo mask substrates, or TFT type display substrates.

We claim:

1. An alkali free glass prepared by a float method consisting essentially of from 53 to 57 wt % of SiO$_2$, from 10 to 14 wt % of Al$_2$O$_3$, from 5.5 to 8.5 wt % of B$_2$O$_3$, from 2 to 4.5 wt % of MgO, from 2 to 5 wt % of CaO, from 2 to 8 wt % of SrO, from 12 to 18 wt % of BaO and from 0 to 2 wt % of ZnO and essentially free from alkali metal oxides.

2. The alkali free glass of claim 1, wherein the weight percentages of the components are as follows:

| SiO$_2$ | 57 |
|---|---|
| Al$_2$O$_3$ | 11 |
| B$_2$O$_3$ | 6 |
| MgO | 2 |
| CaO | 2 |
| SrO | 5 |
| BaO | 15 |
| ZnO | 2 |

3. The alkali free glass of claim 1, wherein the weight percentages of the components are as follows:

| SiO$_2$ | 54 |
|---|---|
| Al$_2$O$_3$ | 14 |
| B$_2$O$_3$ | 8 |
| MgO | 2 |
| CaO | 3 |
| SrO | 6 |
| BaO | 14 |
| ZnO | — |

4. The alkali free glass of claim 1 wherein the weight percentages of the components are as follows:

| SiO$_2$ | 57 |
|---|---|
| Al$_2$O$_3$ | 11 |
| B$_2$O$_3$ | 6 |
| MgO | 2 |
| CaO | 5 |
| SrO | 4 |
| BaO | 15 |
| ZnO | — |

* * * * *